Feb. 25, 1964   R. MADES   3,122,207
SHIP PROPELLERS
Filed Feb. 5, 1962
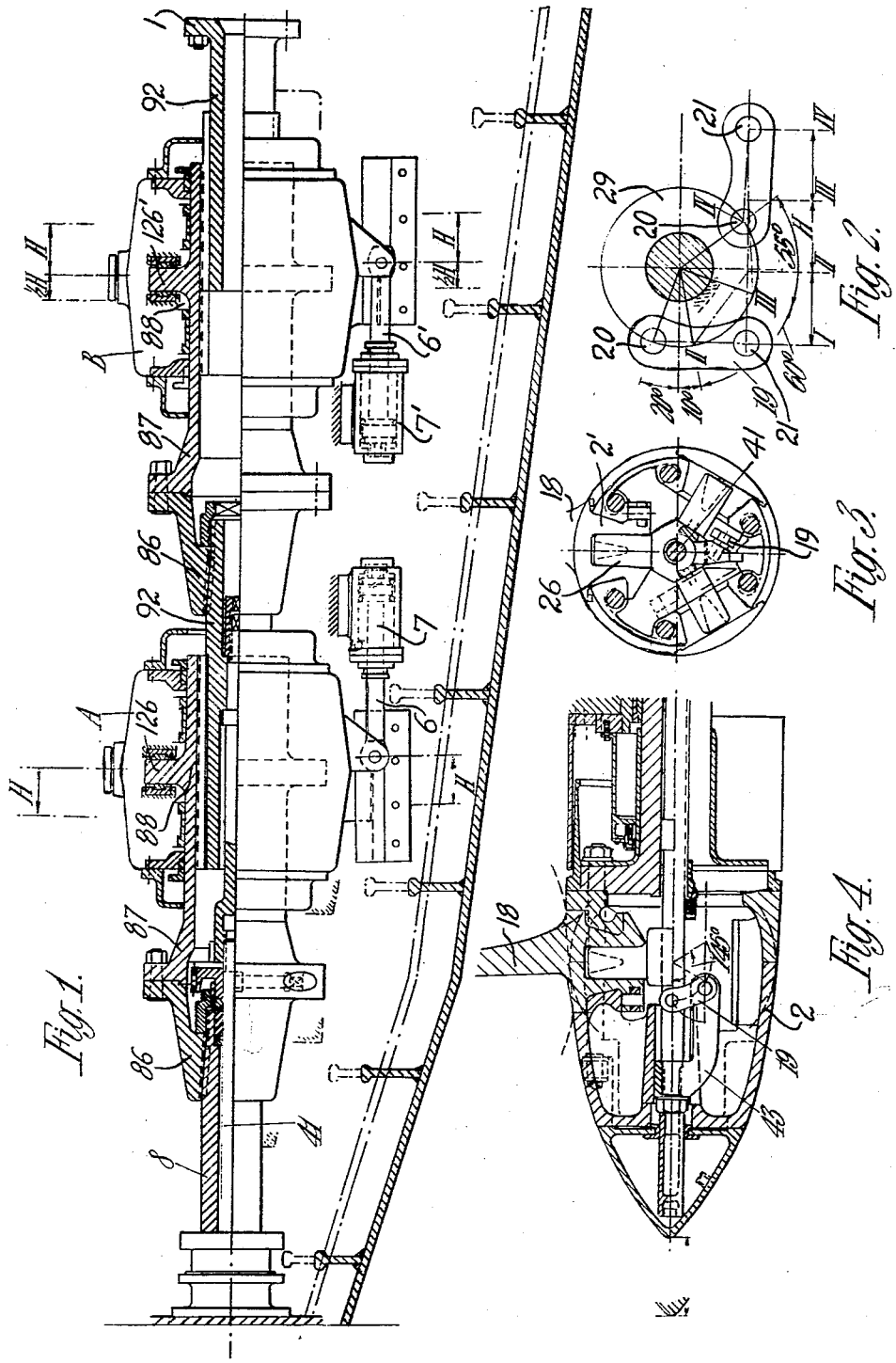

3,122,207
SHIP PROPELLERS
Rudolf Mades, Falkenried 5, Berlin-Dahlem, Germany
Filed Feb. 5, 1962, Ser. No. 170,960
Claims priority, application Germany Feb. 7, 1961
2 Claims. (Cl. 170—160.34)

This invention relates to a reversing device for reversing ships' screw propellers, and constitutes an improvement on the reversible propeller described and claimed in my prior Patent No. 2,916,095.

In my said prior patent I have described a gear mechanism in which a reciprocable main shaft is displaced by a main thrust bearing, whilst a shifting rod is connected to a connecting flange on the main engine. The axial forces arising in the shifting rod are thus intercepted in the main engine, which has one thrust bearing for its crank shaft or turbine shaft.

The object of the present invention is to improve the reversing unit in such a way that it will be able to master all operating conditions, even when there is no wake current. This object is attained by adding a second thrust bearing, of the same design as the main thrust bearing of my prior patent, by means of which the operation of reversing or shifting the propeller blades can be effected by the wake current, or even when there is no wake current.

In order that the invention may be clearly understood and readily carried into effect, one form of construction will now be more fully described with reference to the accompanying drawings, in which:

FIGURE 1 shows part of the installation with the two thrust bearings, partly in side elevation and partly in central longitudinal section;

FIGURE 2 is a diagrammatic longitudinal section showing certain elements of the mechanism in different steering positions; and FIGURES 3 and 4 are respectively a cross section and a longitudinal section through the screw head.

FIGURE 1 illustrates an embodiment in which, for the purpose of controlling axial displacement of the propeller shaft 8, in addition to the adjustable main thrust bearing A, a second adjustable thrust bearing B is arranged astern of the coupling member 1. These thrust bearings A and B engage thrust collers 126 and 126' respectively, which are secured to the propeller shaft 8. The thrust bearings A and B are adapted to be displaced in the fore and aft direction of the ship by means of adjusting devices represented in FIGURE 1 as comprising pistons 6 and 6' slidable in cylinders 7 and 7'. The thrust bearing B, like the thrust bearing A, is connected, by a flange 87 at the rear end of its thrust bearing shaft 88, to a part of a shaft 92 carrying a shifting rod 41, whilst the part of the shaft 92 with the connecting flange 1 at its forward end is slidable in the longitudinally displaceable head of the thrust-bearing shaft 88, and only transmits the torque of the main engine.

The thrust bearing B receives the same displacing stroke as the thrust bearing A, so that either the thrust bearing A displaces the main shaft 8 or the thrust bearing B displaces the shifting rod 41, with a control 43, in the propeller hub 2. The latter operation thus provides a reserve unit, analogous to the reserve manual steering gear associated with steering engines for use in case of accidents, or to the mechanical screw-spindle steering gear for use on failure of an oil-pressure system.

The rear end of the propeller shaft 8 is secured to the propeller hub 2, in which propeller blades 18 are pivotally mounted. These blades can be turned about the axes of their pivots 26 by longitudinal movement of the propeller shaft 8 relative to the control head 43, which is rotatable with the propeller shaft, but which has hitherto normally not been longitudinally movable relatively to the ship's hull. The turning movement is transmitted to the blades from the axial movement of the propeller shaft through the medium of links connecting pivot pins on the control head with crank pins on flanges of the blade pivots. This mechanism, as applied to a control head which is not longitudinally displaceable, is described in detail in my prior Patent No. 2,916,095, and is not further described here, since it does not form part of the present invention. A substantially similar arrangement is however, adopted for operating the second adjustable thrust bearing B of the present invention, which will now be described.

The blades 18 are adjusted by means of links 19 connected to the control head 43 by means of pivot pins 21 on the control head and to the flanges 29 of the blade pivots 26 by means of crank pins 20. When the blades 18 are adjusted for driving the ship ahead, the propeller hub is located in its extreme forward position, the pivot pins 21 on the control head being offset laterally from the axes of rotation of the blade pivots 26, and the crank pins 20 being so located on the flanges 29 that the links 19 are almost tangential to the circle passing through the axes of the crank pins 20.

The possibilities of the present invention are not exhausted by the reserve setting of the displaceable thrust bearing B. On the contrary it fulfils the especially important function of eliminating operating conditions which may occur when engine orders are given in close succession from the bridge which, when carried out, would be inconsistent with the state of travel of the ship at that time. The Commander must, however, have at his disposal an engine unit, which, particularly in exceptional cases, for example for navigational reasons, will without fail carry out the operations commanded. It is therefore not a question of constructing a fool-proof reversing propeller unit, but of designing a unit working by the method patented in Patent No. 2,916,095 for utilizing the forces produced by the wake current, so that it can carry out a specific manoeuvre, which has hitherto not been able to be carried out by the conventional units and with the present state of the art. This is the engine manoeuvre which has to be carried out in test and inspection voyages when the ship is travelling at full engine power and maximum revolutions, and the order is received: "Full speed astern with full engine power." With the present state of the art and conventional design of the blades, and with application of the at present maximum possible oil pressures (70 atmospheres) of the hydraulic adjusting devices, this manoeuvre is possible: but the bridge might now command again: "Full speed ahead," before the reversing screw, which is working backwards, has brought the ship to a standstill and is still, carrying out forward travel because of the residual momentum. In test voyages recently carried out with gas turbine drives, which cannot be throttled in the necessary manner, these manoeuvres have not been able to be carried out, owing to jamming of the conventional shifting devices, and it has been necessary to wait until the ship has lost so much speed that the adjusting forces for the propeller blades are again in control. Such conditions, however, endanger the ship. With gas turbine drives the engine must be switched off, and the ship remains unmanoeuvreable.

According to the present invention, by adding the displaceable thrust bearing B the possibility is provided of bringing the reversing screw which has been brought into the backward position by the thrust bearing A through displacement of the main shaft 8 rearwards, into the forward position again by the thrust bearing B by means of the shifting rod 41 with control head 43 and link 19, FIGURE 2 in that the thrust bearing B is displaced to aft, that is to say enters as it were the displacement range of the thrust bearing A. Kinematically this means that in every case the thrust bearing A takes up the resultant screw thrust and the thrust bearing B takes up the push or pull stresses arising temporarily in the shifting rod 41 and originating from the forces which oppose an adjustment of the blades. These forces may in certain positions of the blades stress the adjusting rod and hence the thrust bearing B to a greater extent than the thrust bearing A. In every case the two thrust bearings work in opposition to one another with a force corresponding to the adjusting resistance of the reversing screw. One is therefore enabled, by adjusting the least stressed thrust bearing in the same direction, to relieve the stress on the other thrust bearing. As the current forces occurring at the reversing screw, in conjunction with the particular state of travel of the ship, are per se difficult to see at a glance, and their direction of application changes, the present invention, by offering two kinematically opposed types of control, provides the possibility of taking the path of least resistance in any particular case, for example in order to eliminate the unmanoeuvrability of the ship as described above.

Besides having the properties of a reversing screw unit, and of a reserve unit in the case of damage, which may occur in all operating conditions, the unit according to the invention is also suitable as a testing unit in an experimental field for propeller researches, or as a large-scale unit in a test ship, for example having a gas turbine drive, it being particularly advantageous for testing the direct drive of the turbine by way of pinion gears or even the turbo-electric drive. Both types of drive suffer from the disadvantage that when the reversing screw passes through the conventional stop position, the gas turbine races if it is not braked by a brake that can be coupled to its surplus speed, somewhat like the wind turbine according to German patent specification No. 743,890, Class 88c, Group 2/04. In a turbo-electric transmission comprising a propeller with fixed blades, similar difficulties occur, as in this case the motor must reverse its direction of rotation; here the gas turbine with the generator may race at zero. However, even in the case of reversing gears of high power with a gas turbine drive, provision has been made for brakes for the time of reversing, compare British patent specification No. 854,000 (Class F06h, Germany Class 65f², Group 9).

As the thrust bearing B is used only temporarily, it is advisable to clamp the bases of the bearing in their guides, in such a manner that the upper guide plates are pressed against the bearing bases by oil pressure pistons. The control is then so arranged that at first the oil pressure pistons are relieved of pressure. This type of construction is known in the iron and steel industry in rolling mills comprising a progressive assembly line, in which heavy roll stands are hydraulically displaced on rails and hydraulically clamped.

One advantage of the gear arrangement according to FIGURE 1 consists in that by subdividing the shaft line into three sections, the dangerous longitudinal vibrations are immediately intercepted in the first main thrust bearing A and do not reach the pinion gear; moreover the whole shaft line is made more flexible by the subdivision and can better follow the bending of the ship.

I claim:

1. A reversible screw propeller for ships, comprising: a main thrust bearing displaceable in the fore and aft direction of the ship, an adjusting device connected to the thrust bearing to effect the fore and aft displacement thereof and to retain it in its adjusted position, a propeller shaft connected to the main thrust bearing and displaceable axially in the fore and aft direction therewith, a screw propeller aggregate, including; a hollow hub fixed to the propeller shaft, blades pivotally mounted on the hub, and means for effecting angular adjustment of the blades, the blade-adjusting means including: a control head within the hub, a second thrust bearing, also connected with the propeller shaft for axial fore and aft displacement therewith, the second thrust bearing being adapted to displace the control head in a fore-and-aft direction so as to facilitate a change from "full speed astern" "full speed ahead," flanges integral with the blade pivots inside the hub, crank pins on the flanges, pivot pins on the control head offset laterally from the axes of rotation of the blade pivots, and links connecting the said pivot pins to the said crank pins so as to extend almost tangentially to the said flanges when the hub is in its extreme forward position to set the blades in the position for propulsion ahead, and so as to rotate the blade pivots to adjust the blades for impelling the ship astern when the propeller shaft and propeller aggregate are displaced rearwardly with respect to the control head, and to rotate the blade pivots to restore the blades to the position for propelling the ship ahead when the propeller shaft is displaced forwards again.

2. A reversible screw propeller for ships as claimed in claim 1, the length of the links connecting the pivot pins with the crank pins being about 20 percent greater than the radius of the circle containing the axes of the crank pins, so as to enable the blades to be turned through an angle of 145 degrees.

References Cited in the file of this patent

UNITED STATES PATENTS

| | | |
|---|---|---|
| 642,601 | Gere | Feb. 6, 1900 |
| 2,916,095 | Mades | Dec. 8, 1959 |